US010382813B2

(12) United States Patent
Shimizu et al.

(10) Patent No.: US 10,382,813 B2
(45) Date of Patent: Aug. 13, 2019

(54) CONTENT REPRODUCTION DEVICE AND CONTENT REPRODUCTION METHOD

(71) Applicants: Naoyuki Shimizu, Kanagawa (JP); Ryohta Kawamata, Kanagawa (JP); Mototsugu Emori, Tokyo (JP)

(72) Inventors: Naoyuki Shimizu, Kanagawa (JP); Ryohta Kawamata, Kanagawa (JP); Mototsugu Emori, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/914,187

(22) Filed: Mar. 7, 2018

(65) Prior Publication Data
US 2018/0199096 A1 Jul. 12, 2018

Related U.S. Application Data

(63) Continuation of application No. PCT/JP2016/003803, filed on Aug. 22, 2016.

(30) Foreign Application Priority Data

Sep. 15, 2015 (JP) .................................. 2015-181591

(51) Int. Cl.
*H04N 7/173* (2011.01)
*H04N 21/433* (2011.01)
(Continued)

(52) U.S. Cl.
CPC ..... *H04N 21/4331* (2013.01); *H04L 49/9057* (2013.01); *H04N 21/4122* (2013.01);
(Continued)

(58) Field of Classification Search
CPC ........... H04N 21/4331; H04N 21/4122; H04N 21/436; H04N 21/43615; H04N 21/44004;
(Continued)

(56) References Cited

U.S. PATENT DOCUMENTS 5,602,956 A * 2/1997 Suzuki ................. G11B 27/034
375/E7.004
7,471,298 B1 * 12/2008 Noonburg ............ H04N 19/186
345/531
(Continued)

FOREIGN PATENT DOCUMENTS

JP 2001-189755 7/2001
JP 2007-150859 6/2007
(Continued)

OTHER PUBLICATIONS

Extended European Search Report dated Jul. 2, 2018 in European Patent Application No. 16845884.2 citing documents AA-AC and AX therein, 10 pages.
(Continued)

*Primary Examiner* — Nnenna N Ekpo
(74) *Attorney, Agent, or Firm* — Oblon, McClelland, Maier & Neustadt, L.L.P.

(57) ABSTRACT

A content reproduction device includes a communication unit, a data acquirer, a buffering controller, a buffering condition determiner, a reassembler, and a content reproducer. The communication unit is configured to communicate with an information processing device. The data acquirer is configured to sequentially acquire pieces of data from the information processing device via the communication unit. The buffering controller is configured to buffer the pieces of data in a storage. The buffering condition determiner is configured to determine a buffering condition for buffering the pieces of data, depending on a condition of communication with the information processing device. The reassembler is configured to reassemble the pieces of data buffered in the storage in a predetermined order when the determined buffering condition is satisfied. The content
(Continued)

reproducer is configured to reproduce a content based on the reassembled pieces of data.

11 Claims, 13 Drawing Sheets

(51) Int. Cl.
    *H04N 21/41*     (2011.01)
    *H04N 21/436*     (2011.01)
    *H04N 21/44*     (2011.01)
    *H04L 12/861*     (2013.01)
    *H04N 21/6375*     (2011.01)
    *H04N 21/647*     (2011.01)

(52) U.S. Cl.
    CPC ..... *H04N 21/436* (2013.01); *H04N 21/43615* (2013.01); *H04N 21/44004* (2013.01); *H04N 21/6375* (2013.01); *H04N 21/64776* (2013.01)

(58) Field of Classification Search
    CPC .......... H04N 21/6375; H04N 21/64776; H04L 49/9057
    USPC ... 725/115, 89–94, 116, 134, 145, 146, 147, 725/153
    See application file for complete search history.

(56) References Cited

U.S. PATENT DOCUMENTS

| | | | |
|---|---|---|---|
| 2002/0031125 A1* | 3/2002 | Sato | H04L 29/06027 370/394 |
| 2005/0254577 A1* | 11/2005 | Ando | H04N 19/176 375/240.03 |
| 2008/0172441 A1 | 7/2008 | Speicher et al. | |
| 2009/0313517 A1* | 12/2009 | Schedelbeck | H04L 1/0083 714/748 |
| 2010/0299448 A1* | 11/2010 | Cuoq | H04L 47/10 709/234 |
| 2014/0226560 A1 | 8/2014 | Parron et al. | |

FOREIGN PATENT DOCUMENTS

| | | |
|---|---|---|
| JP | 2011-146998 | 7/2011 |
| JP | 2014-157243 | 8/2014 |

OTHER PUBLICATIONS

Lundan, M. et al. 3GPP Streaming over GPRS Rel. '97', Computer Communications and Network, ICCCN 2003. XP010695704, Oct. 2003, pp. 101-106.
International Search Report dated Nov. 22, 2016 in PCT/JP2016/003803 filed on Aug. 22, 2016.
Written Opinion dated Nov. 22, 2016 in PCT/JP2016/003803 filed on Aug. 22, 2016.

\* cited by examiner

FIG.11

| DATA TYPE | BUFFERING TIME |
|---|---|
| AUDIO | $T_6$ |
| VIDEO | $T_7$ |
| BEST EFFORT | $T_8$ |
| BACKGROUND | $T_9$ |

CONTENT REPRODUCTION DEVICE AND CONTENT REPRODUCTION METHOD

CROSS-REFERENCE TO RELATED APPLICATIONS

The present application is a continuation application of International Application No. PCT/JP2016/003803, filed Aug. 22, 2016, which claims priority to Japanese Patent Application No. 2015-181591, filed Sep. 15, 2015. The contents of these applications are incorporated herein by reference in their entirety.

BACKGROUND OF THE INVENTION

1. Field of the Invention

The present invention relates to a content reproduction device and a content reproduction method.

2. Description of the Related Art

In recent years, content reproduction systems are known in which a content reproduction device, such as a video reproduction device such as a projector or a display and an audio reproduction device such as a music player or an audio player, and an information processing device such as a tablet terminal, a PC (Personal Computer), or a smart phone, are connected with each other, and the content reproduction device reproduces contents such as video and audio based on data such as image data and audio data transmitted from the information processing device.

In such a content reproduction system, assume a case in which the information processing device has first transmitted data of sequence numbers #1 and #2 and has then transmitted data of sequence numbers #3 and #4 to the content reproduction device, for example.

In this case, depending on the condition of communication with the information processing device, the orders of data may be different between the transmitting end and the receiving end, in such a manner that the content reproduction device first receives the data of #3 and #4 and then receives the data of #1 and #2.

In such a case, after the content reproduction device reproduced a content based on the data of #3 and #4, the data that the content reproduction device has actually received next are the data of #1 and #2 although a content based on data of #5 and #6 is to be reproduced next.

Since, however, the content reproduction device can only reproduce contents according to the sequence numbers, the content cannot be reproduced after the content based on the data of #3 and #4 is reproduced.

Thus, content reproduction devices configured to discard data that should have come previously but have come later in a different order so as not to stop reproduction of contents are known.

For example, when such a content reproduction device has received the data of #3 and #4 first and has then received the data of #1 and #2, the content reproduction device is configured to discard the data of #1 and #2 so as to prevent reproduction of contents from being stopped.

In such a content reproduction device, however, since data corresponding to a content that should have been reproduced are discarded, part of the content is not reproduced, which leads to such a problem of degradation in content reproduction quality.

Thus, a content reproduction device provided with a buffer for temporarily storing data and configured to store data received until a predetermined time (hereinafter referred to as a "buffering time") elapses into the buffer and reassemble the data stored in the buffer according to sequence numbers after a lapse of the buffering time has been proposed and is already known (refer, for example, to Japanese Unexamined Patent Application Publication No. 2001-189755).

Such a content reproduction device of the related art as disclosed in Japanese Unexamined Patent Application Publication No. 2001-189755, however, has such a problem in which a content may not be reproduced at a timing when the content should be reproduced and a delay corresponding to the buffering time may occur in the timing of content reproduction.

SUMMARY OF THE INVENTION

According to one aspect of the present invention, a content reproduction device includes a communication unit, a data acquirer, a buffering controller, a buffering condition determiner, a reassembler, and a content reproducer. The communication unit is configured to communicate with an information processing device. The data acquirer is configured to sequentially acquire pieces of data from the information processing device via the communication unit. The buffering controller is configured to buffer the pieces of data in a storage. The buffering condition determiner is configured to determine a buffering condition for buffering the pieces of data, depending on a condition of communication with the information processing device. The reassembler is configured to reassemble the pieces of data buffered in the storage in a predetermined order when the determined buffering condition is satisfied. The content reproducer is configured to reproduce a content based on the reassembled pieces of data.

BRIEF DESCRIPTION OF THE DRAWINGS

FIG. 11 is a table illustrating an example of a buffering time determination table stored by a buffering time storage unit according to an embodiment of the present invention;

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
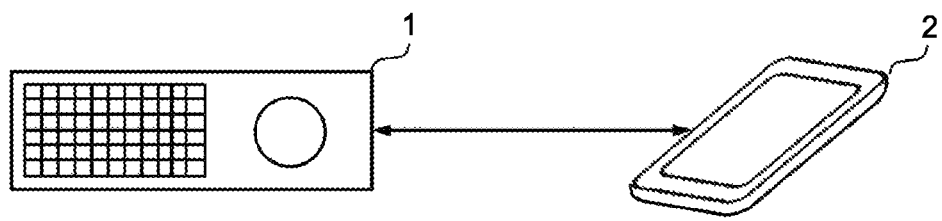
FIG. 1 is a diagram illustrating a mode of operation of a content reproduction system according to an embodiment of the present invention.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

An object of an embodiment is to prevent degradation in the quality of content reproduction and reduce delays in content reproduction timing.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

First Embodiment

An embodiment of the present invention is described in detail below with reference to the drawings. In the present embodiment, description will be given on a content reproduction system in which a content reproduction device, such as a video reproduction device such as a projector or a display and an audio reproduction device such as a music player or an audio player, and an information processing device such as a tablet terminal, a PC (Personal Computer), or a smart phone, are connected with each other, and the content reproduction device reproduces contents such as video and audio based on data such as image data and audio data transmitted from the information processing device.

In particular, in the present embodiment, a video display system in which a video display device and an information processing device are connected with each other and the video display device displays video on the basis of image data transmitted from the information processing device will be described.

First, a mode of operation of the video display system according to the present embodiment will be described with reference to FIG. 1. FIG. 1 is a diagram illustrating a mode of operation of the video display system according to the present embodiment.

As illustrated in FIG. 1, the video display system according to the present embodiment includes a projector 1 and a client terminal 2 connected with each other in such a manner that the projector 1 and the client terminal 2 can communicate with each other.

The projector 1 modulates light beams emitted from a light source according to input video signals to form optical images, and projects the formed projection images for display on a projection plane such as a wall or a screen in an enlarged manner. In the present embodiment, video is projected for display according to image data transmitted from the client terminal 2.

The client terminal 2 is an information processing terminal operated by a user, and is constituted by an information processing device such as a PC (Personal Computer), a PDA (Personal Digital Assistant), a smart phone, or a tablet terminal.

The projector 1 and the client terminal 2 are connected using interfaces based on a standard such as LAN (Local Area Network), Ethernet (registered trademark), USB (Universal Serial Bus), Bluetooth (registered trademark), Wi-Fi (Wireless Fidelity) (registered trademark), FeliCa (registered trademark), PCIe (Peripheral Component Interconnect Express), VGA (Video Graphics Array), DVI (Digital Visual Interface), or IEEE (The Institute of Electrical and Electronics Engineers).

Note that an example in which the projector 1 and the client terminal 2 are in conformity with Wi-Fi (registered trademark) CERTIFIED Miracast and image data are transmitted and received with use of the Real-time Transport Protocol (hereinafter referred to as "RTP") will be described in the present embodiment.

Figure 2:
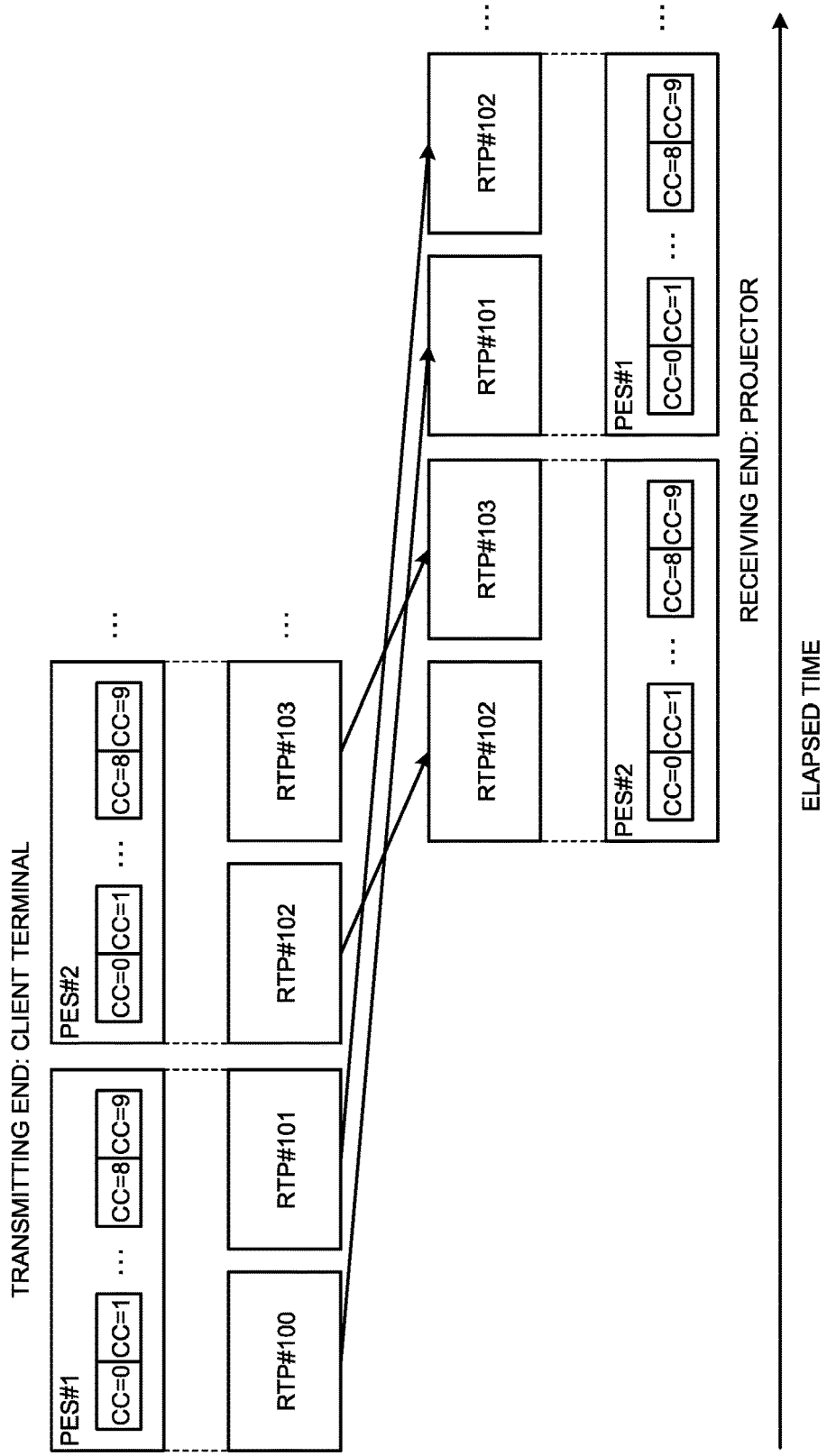
FIG. 2 is a diagram for explaining the order in which image data are transmitted in transmission of the image data from a client terminal to a projector in a video display system according to an embodiment of the present invention.

Next, the order in which image data are transmitted in transmission of the image data from the client terminal 2 to the projector 1 in the video display system according to the present embodiment will be described with reference to FIG. 2. FIG. 2 is a diagram for explaining the order in which image data are transmitted in transmission of the image data from the client terminal 2 to the projector 1 in the video display system according to the present embodiment.

As illustrated in FIG. 2, in transmission/detection of image data using the RTP, the client terminal 2 (transmitting end) packetizes image data in units of PESs (Packetized Elementary Streams) for transmission to the projector 1 (receiving end). Note that each PES is constituted by a plurality of CCs (Continuity Counters). PESs into which image data are thus packetized in units of PESs in this process are referred to as PES#1, PES#2, . . . .

The client terminal 2 (transmitting end) then divides each PES into a plurality of RTP packets for transmission to the projector 1 (receiving end). Assume here that the client terminal 2 (transmitting end) divides PES#1 into RTP#100 and RTP#101, and PES#2 into RTP#102 and RTP#103. Note that #00 refers to a sequence number indicating the order in which RTP packets are transmitted by the client terminal 2.

In this case, the RTP packets should reach the projector 1 in an order of RTP#100, RTP#101, RTP#102, and RTP#103. Depending on the condition of communication between the projector 1 (receiving end) and the client terminal 2 (transmitting end), however, the order of the RTP packets may be different between the transmitting end and the receiving end and the RTP packets may reach the projector 1 in an order of RTP#102, RTP#103, RTP#100, and RTP#101 as illustrated in FIG. 2.

In such a case, although packets to be reconstructed next by the projector 1 after reconstruction of RTP#102 and RTP#103 are RTP#104 and RTP#105, the packets that are actually received by the projector 1 are RTP#100 and RTP#101.

Since, however, the projector 1 can only reconstruct RTP packets in the order of the sequence numbers, the projector 1 cannot reconstruct the RTP packets after reconstruction of RTP#102 and RTP#103. Thus, in this case, the projector 1 can no longer reproduce video at this point.

Figure 3:
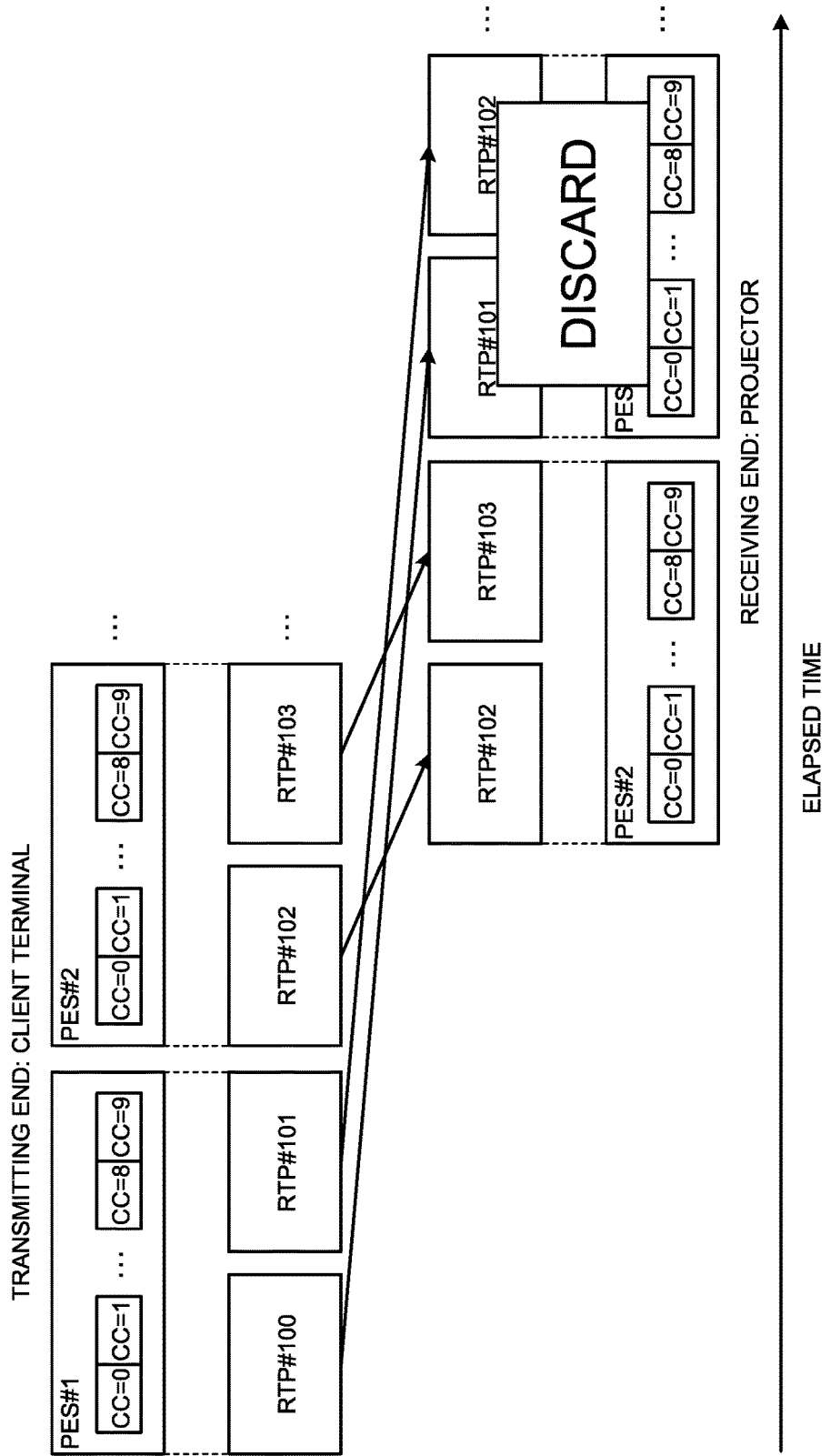
FIG. 3 is a diagram for explaining processing of RIP packets received by a projector in a video display system of related art.

In view of this, as illustrated in FIG. 3, the projector 1 may discard RTP packets that should have come previously but have actually come later in a different order so as not to stop reproduction of video. In this case, however, since RTP packets corresponding to video, which should have been reproduced, are discarded, part of the video is not reproduced and the quality of video reproduction is degraded.

Thus, in the video display system of the related art, the projector is provided with a data buffer for temporarily storing data and configured to store RTP packets received until a predetermined time (hereinafter referred to as a "buffering time") elapses in to the data buffer and reassemble the RTP packets stored in the data buffer according to sequence numbers after a lapse of the buffing time.

Figure 4:
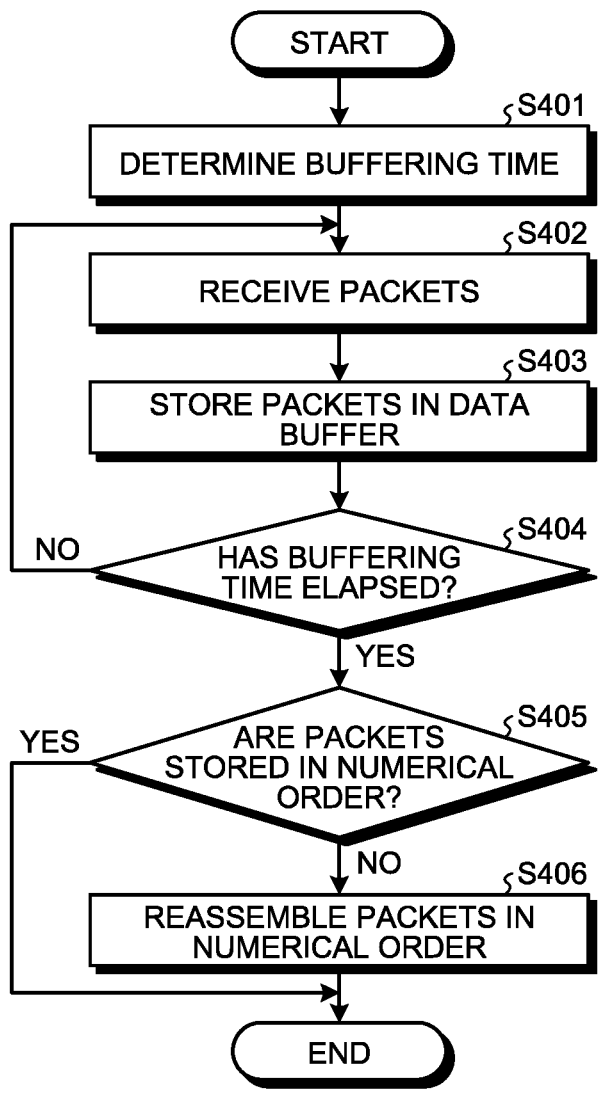
FIG. 4 is a flowchart for explaining processing for reassembling RIP packets received by a projector in an order of sequence numbers in a video display system of related art.

Here, specific processing for reassembling RTP packets received by the projector in the order of sequence numbers in the video display system of the related art will be described with reference to FIG. 4. FIG. 4 is a flowchart for explaining the processing for reassembling RTP packets received by the projector in the order of sequence numbers in the video display system of the related art.

As illustrated in FIG. 4, for reassembling received RTP packets in the order of sequence numbers in the video display system of the related art, the projector first determines the buffering time in advance (S401).

Upon receiving RTP packets (S402), the projector then temporarily stores the RTP packets in to the data buffer (S403), and determines whether or not the time elapsed from reception of the first RTP packet has reached the buffering time (S404).

The projector then repeats reception of RTP packets and storage of the received RTP packets into the data buffer (S402, S403) until the elapsed time reaches the buffering time (S404/NO).

When the elapsed time has reached the buffering time (S404/YES), the projector reassembles the RTP packets stored in the data buffer in the order of sequence numbers (S406) if the RTP packets are not in the order of sequence numbers (S405/NO) or does not reassemble the RTP packets if the RTP packets are in the order of sequence numbers (S405/YES).

The projector then reconstructs image data from the RTP packets in the order of sequence numbers, and performs projection and display of video on the basis of the reconstructed image data.

As described above, in the video display system of the related art, the projector is configured to determine the buffering time in advance and reassemble RTP packets stored in the data buffer until the buffering time elapses in the order of sequence numbers.

Note that the buffering time may be short or need not be set under such conditions where the communication between the projector and the client terminal is in good condition and where the order of RTP packets at the receiving end is only a little different or is not different from that at the transmitting end.

In the video display system of the related art, however, the projector is provided with a constant buffering time regardless of the condition of communication with the client terminal as explained with reference to FIG. 4. Thus, in the video display system of the related art, the buffering time is unnecessarily long in a case where the communication between the projector and the client terminal is in good condition and where the order of RTP packets at the receiving end is only a little different or is not different from that at the transmitting end.

Consequently, in the video display system of the related art, the timing of video reproduction is delayed by the time corresponding to the constant buffing time even when the communication between the projector and the client terminal is in good condition.

In the video display system according to the present embodiment, the projector 1 is therefore configured to determine the buffering time depending on the condition of communication with the client terminal 2.

Specifically, in the video display system according to the present embodiment, the projector 1 is configured to set a long buffering time when the condition of communication with the client terminal 2 is poor and set a short buffering time when the condition of communication with the client terminal 2 is good.

More specifically, in the video display system according to the present embodiment, the projector 1 is configured to repeat requesting connection until a connection response is provided from the client terminal 2 and determine the buffering time depending on the number of connection requests.

In other words, in the video display system according to the present embodiment, the projector 1 is configured to repeat requesting connection until a connection response is provided from the client terminal 2, determine that the condition of communication with the client terminal 2 is worse and set a longer buffering time as the number of connection requests is larger, and determine that the condition of communication with the client terminal 2 is better and set a shorter buffering time as the number of connection requests is smaller.

In the video display system according to the present embodiment, the projector 1 configured as described above is capable of preventing degradation in the quality of video reproduction and reducing delays in video reproduction timing.

Figure 5:
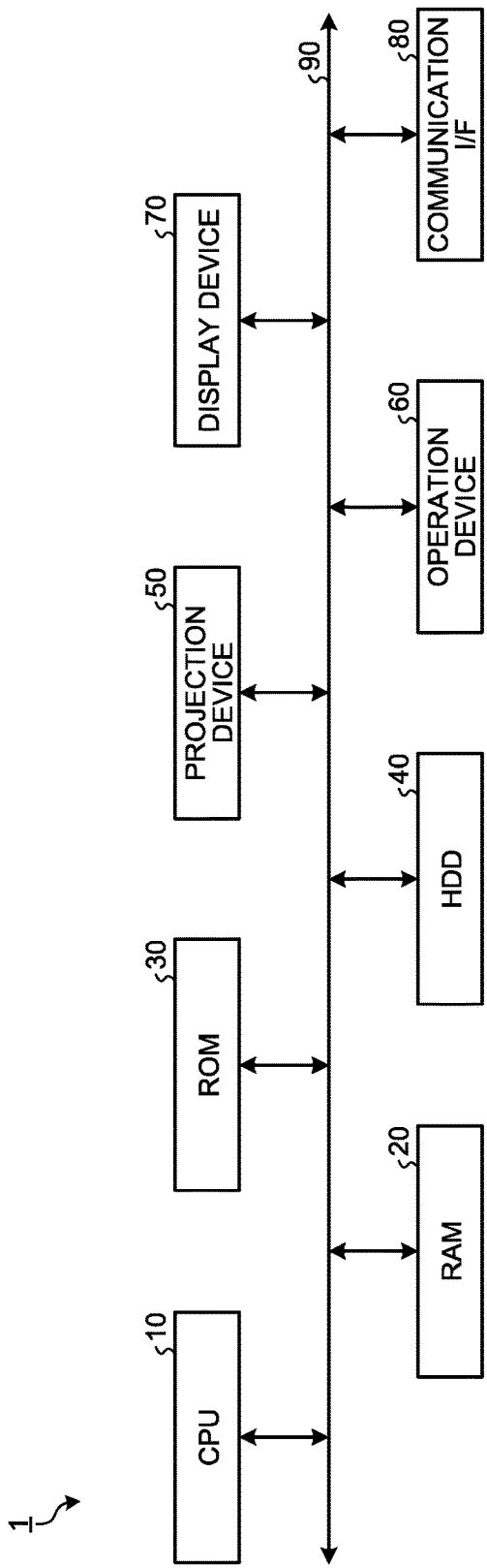
FIG. 5 is a block diagram schematically illustrating a hardware configuration of a projector according to an embodiment of the present invention.

Next, hardware configurations of the projector 1 and the client terminal 2 according to the present embodiment will be described with reference to FIG. 5. FIG. 5 is a block diagram schematically illustrating a hardware configuration of the projector 1 according to the present embodiment. While a hardware configuration of the projector 1 is illustrated as an example in FIG. 5, similar configuration is applicable to the client terminal 2.

As illustrated in FIG. 5, the projector 1 according to the present embodiment includes a CPU (Central Processing Unit) 10, a RAM (Random Access Memory) 20, a ROM (Read Only Memory) 30, a HDD (Hard Disk Drive) 40, a projection device 50, an operation device 60, a display device 70, and a communication I/F 80, which are connected with one another via a bus 90.

The CPU 10 is computing means that controls operation of the entire projector 1. The RAM 20 is a volatile storage medium from/into which information can be read and written at high speeds, and is used as a working area for the CPU 10 to process information. The ROM 30 is a read-only non-volatile storage medium and stores programs such as firmware.

The HDD 40 is a non-volatile storage medium from/into which information can be read and written, and stores various data such as image data, an operating system (OS), various control programs, application programs such as content reproduction programs.

The projection device 50 is hardware for implementing special functions of the projector 1. Specifically, the projection device 50 modulates light beams emitted from a light source to form optical images, and projects the formed projection images for display on a projection plane such as a wall or a screen in an enlarged manner. Note that the client terminal 2 need not include the projection device 50 since the client terminal 2 is an information processing terminal to be operated by a user.

The operation device 60 is a user interface for inputting information to the projector 1, and is constituted by an input device such as a keyboard and a mouse, input buttons, and a touch panel.

The display device 70 is a visual user interface for the user to check the state of the projector 1, and is constituted by a display device such as an LCD (Liquid Crystal Display) or an output device such as an LED (Light Emitting Diode).

The communication I/F 80 is an interface for the projector 1 to communicate with other devices, and is constituted by an interface based on a standard such as Ethernet (registered trademark), USB, Bluetooth (registered trademark), Wi-Fi (registered trademark), FeliCa (registered trademark), PCIe, or IEEE.

With such a hardware configuration, programs stored in storage media such as the ROM 30 and the HDD 40 are read onto the RAM 20, and the CPU 10 performs computation according to the programs loaded onto the RAM 20 to form software controllers.

Combination of the thus formed software controllers and hardware constitute functional blocks realizing the functions of the projector 1 and the client terminal 2 according to the present embodiment.

Figure 6:
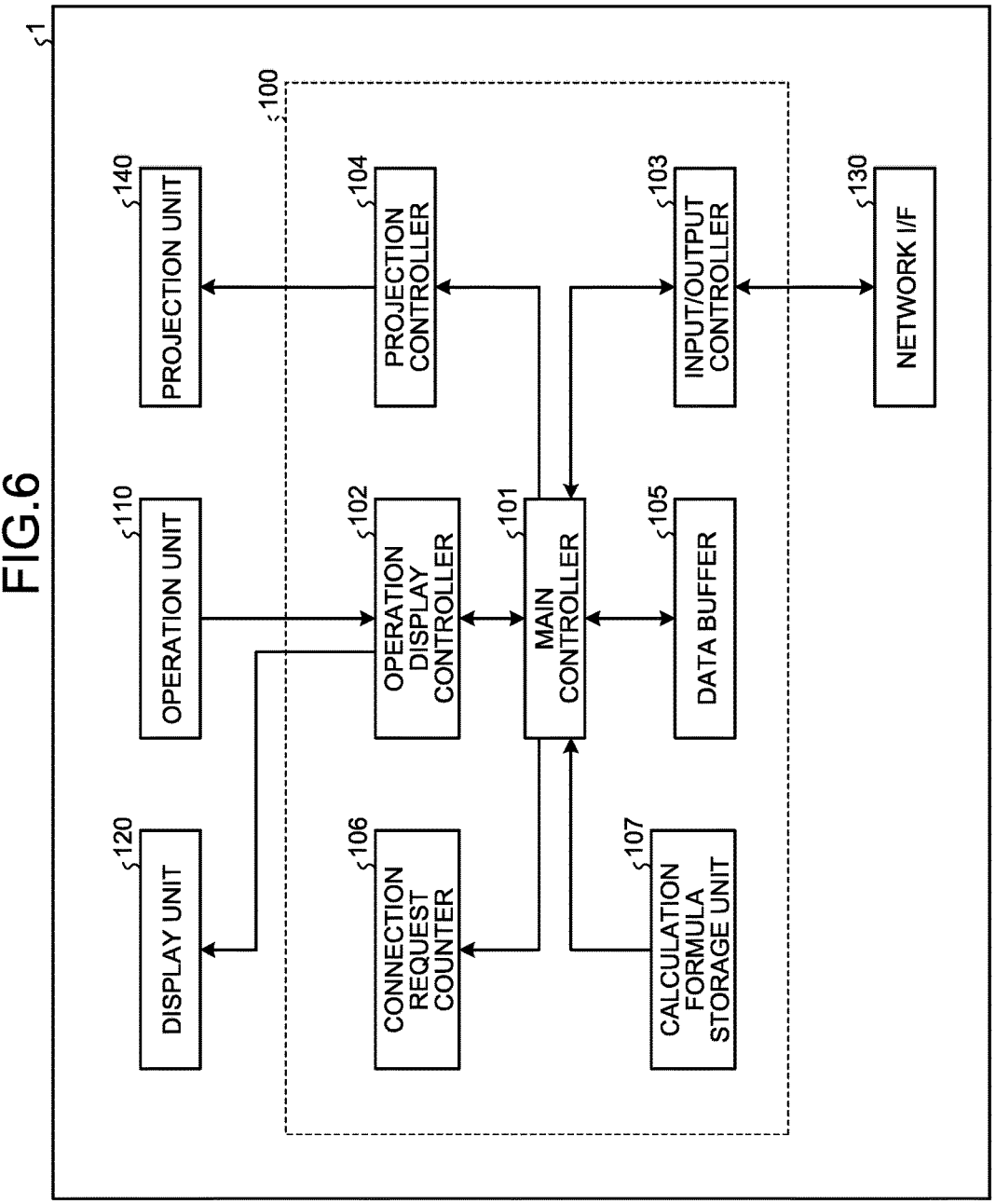
FIG. 6 is a block diagram schematically illustrating a functional configuration of a projector according to an embodiment of the present invention.

Next, a functional configuration of the projector 1 according to the present embodiment will be described with reference to FIG. 6. FIG. 6 is a block diagram schematically illustrating the functional configuration of the projector 1 according to the present embodiment.

As illustrated in FIG. 6, the projector 1 according to the present embodiment includes a controller 100, an operation unit 110, a display unit 120, a network I/F 130, and a projection unit 140. The controller 100 includes a main controller 101, an operation display controller 102 an input/output controller 103, a projection controller 104, a data buffer 105, a connection request counter 106, and a calculation formula storage unit 107.

The operation unit 110 is an input interface for the user to directly operate the projector 1 or to input information to the projector 1. The operation unit 110 is implemented by the operation device 60 illustrated in FIG. 5.

The display unit 120 is an output interface for visually displaying the state of the projector 1 and also an input interface in a form of a touch panel for the user to directly operate the projector 1 or to input information to the projector 1. Thus, the display unit 120 includes a function of displaying an image for receiving user's operation. The display unit 120 is implemented by the display device 70 illustrated in FIG. 5.

The network I/F 130 is an interface for the projector 1 to communicate with other devices such as the client terminal 2 via a network, and is constituted by an interface based on a standard such as Ethernet (registered trademark), USB, Bluetooth (registered trademark), Wi-Fi (registered trademark), FeliCa (registered trademark), PCIe, or IEEE. The network I/F 130 is implemented by the communication I/F 80 illustrated in FIG. 5. Thus, in the present embodiment, the network I/F 130 functions as a communication unit.

The projection unit 140 is an output interface for modulating light beams emitted from a light source to form optical images and projecting the formed projection images for display on a projection plane such as a wall or a screen in an enlarged manner. The projection unit 140 is implemented by the projection device 50 illustrated in FIG. 5.

The controller 100 is implemented by combination of software and hardware. Specifically, the controller 100 is constituted by software controllers, which are formed by loading programs stored in storage media such as the ROM 30 and the HDD 40 onto the RAM 20 and performing computation according to the programs by the CPU 10, and hardware such as integrated circuits.

The main controller 101 serves to control respective components included in the controller 100, and gives instructions to the respective components of the controller 100. The main controller 101 also controls the input/output controller 103 to access other devices via the network I/F 130.

The operation display controller 102 displays screens on the display unit 120 under the control of the main controller 101 or inputs information, signals, and instructions input via the operation unit 110 to the main controller 101. The main controller 101 then gives instructions to the respective components of the controller 100 according to the information, signals, and instructions input from the operation display controller 102.

The input/output controller 103 transmits information, signals, and instructions to other devices via the network I/F 130 under the control of the main controller 101 or inputs information, signals, and instructions input via the network I/F 130 to the main controller 101. The main controller 101 then gives instructions to the respective components of the controller 100 according to the information, signals, and instructions input from the input/output controller 103.

The projection controller 104 controls or drives the projection unit 140 under the control of the main controller 101. The data buffer 105 temporarily stores image data transmitted from the client terminal 2.

The connection request counter 106 counts the number of connection requests made by the projector 1 to the client terminal 2. The calculation formula storage unit 107 stores a calculation formula for calculating the buffering time.

Figure 7:
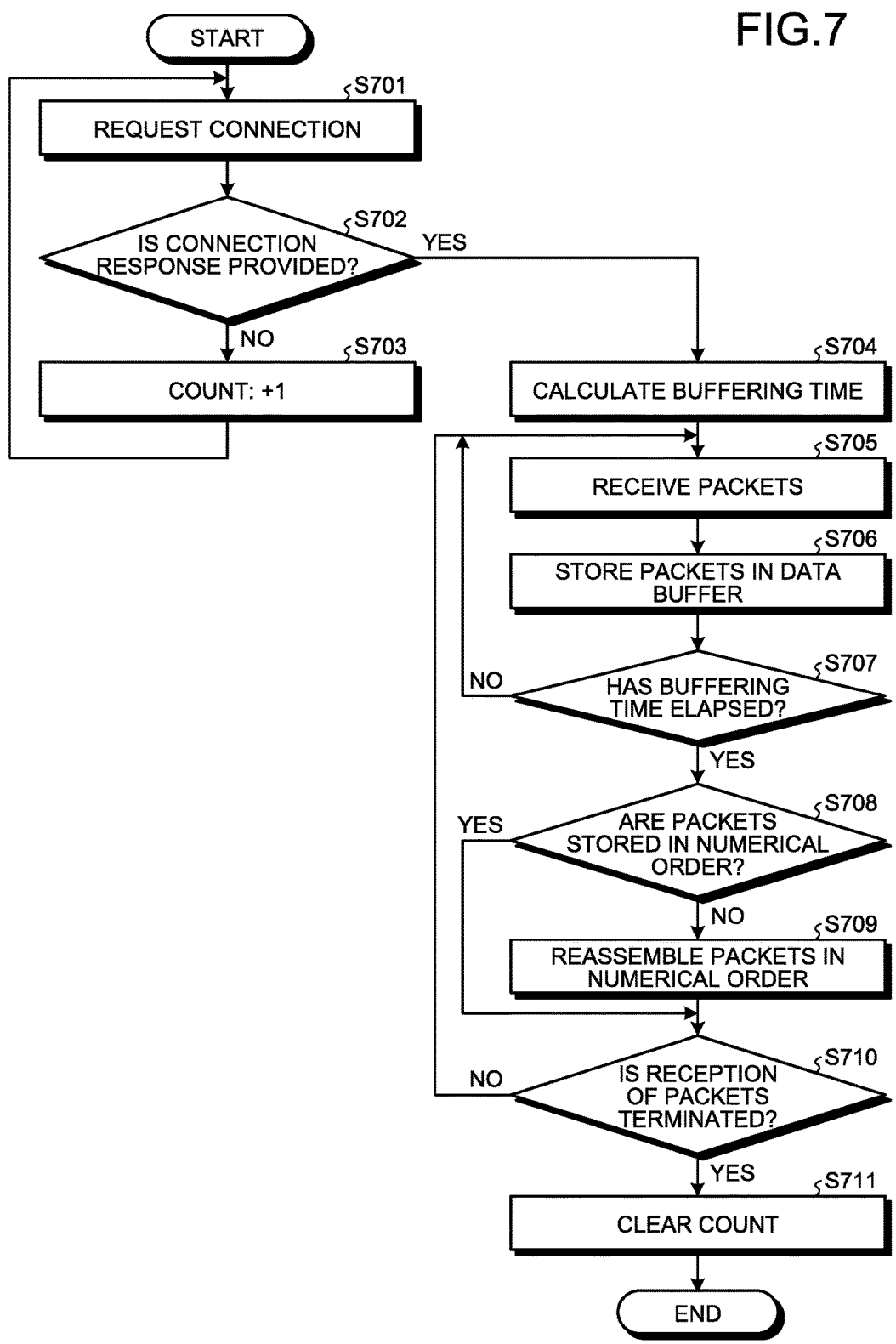
FIG. 7 is a flowchart for explaining processing for reassembling RIP packets received by a projector in an order of sequence numbers in a video display system according to an embodiment of the present invention.

Next, specific processing for reassembling RTP packets received by the projector 1 in the order of sequence numbers in the video display system according to the present embodiment will be described with reference to FIG. 7. FIG. 7 is a flowchart for explaining the processing for reassembling RTP packets received by the projector 1 in the order of sequence numbers in the video display system according to the present embodiment.

As illustrated in FIG. 7, for reassembling RTP packets received by the projector 1 in the order of the sequence numbers in the video display system according to the present embodiment, the main controller 101 first controls the input/output controller 103 to request connection to the client terminal 2 (S701).

The main controller 101 then determines whether or not a connection response is provided from the client terminal 2 in response to the connection request made in S701 before a lapse of a certain time from the connection request (S702).

Note that the projector 1 uses Wi-Fi (registered trademark) Direct as a communication path between the projector 1 and the client terminal 2 in the video display system according to the present embodiment. The projector 1 makes the connection request until the communication with the client terminal 2 is established, that is, until a connection request comes from the client terminal 2 by using CSMA/CA according to the specification of IEEE802.11 in a communication counterpart search phase using the Wi-Fi (registered trademark) Direct.

If no connection response has been provided until the certain time elapses after the connection request in the determination process in S702 (S702/NO), the main controller 101 then adds 1 to the count of the connection request counter 106 (S703).

If a connection response is provided before the certain time elapses after the connection request in the determination process in S702 (S702/YES), the main controller 101 calculates the buffering time on the basis of the count of the connection request counter 106 and the calculation formula stored in the calculation formula storage unit 107 (S704). Thus, in the present embodiment, the main controller 101 functions as a buffering condition determining unit to determine the buffering time as a buffering condition.

In this process, the main controller 101 calculates the buffering time by a calculation formula "buffering time=$T_1$+count×$T_2$" stored in the calculation formula storage unit 107. In the formula, $T_1$ and $T_2$ are given positive integers. Note that $T_1$ and $T_2$ may be fixed values or may be values set by the user in the projector 1 according to the present embodiment.

Upon receiving RTP packets from the client terminal 2 (S705), the main controller 101 then temporarily stores the RTP packets in the data buffer 105 (S706). Thus, in the present embodiment, the main controller 101 also functions as a data acquisition unit and a buffering controller, and the data buffer 105 functions as a storage unit.

The main controller 101 then determines whether or not the time elapsed from reception of the first RTP packet has reached the buffering time calculated in S704 (S707).

The main controller 101 then repeats reception of RTP packets and storage of the received RTP packets into the data buffer 105 (S705, S706) until the elapsed time reaches the buffering time calculated in S704 (S707/NO).

When the elapsed time has reached the buffering time calculated in S704 (S707/YES), the main controller 101 then reassembles the RTP packets stored in the data buffer 105 in the order of sequence numbers (S709) if the RTP packets are not in the order of sequence numbers (S708/NO) or does not reassemble the RTP packets if the RTP packets are in the order of sequence numbers (S708/YES). Thus, in the present embodiment, the main controller 101 functions as a reassembling unit.

The main controller 101 then reconstructs image data from the RTP packets in the order of sequence numbers, and controls the projection controller 104 to project and display video from the projection unit 140 on the basis of the reconstructed image data. Thus, in the present embodiment, the main controller 101 functions as a content reproducing unit.

The main controller 101 then repeats the processing from S705 (S705, S706) until reception of RTP packets is terminated (S710/NO), and clears the count of the connection request counter 106 (S711) when reception of RTP packets is terminated (S710/YES).

As described above, in the video display system according to the present embodiment, the projector 1 is configured to determine the buffering time depending on the condition of communication with the client terminal 2.

Specifically, in the video display system according to the present embodiment, the projector 1 is configured to set a long buffering time when the condition of communication with the client terminal 2 is poor and set a short buffering time when the condition of communication with the client terminal 2 is good.

More specifically, in the video display system according to the present embodiment, the projector 1 is configured to repeat requesting connection until a connection response is provided from the client terminal 2 and determine the buffering time depending on the number of connection requests.

In other words, in the video display system according to the present embodiment, the projector 1 is configured to repeat requesting connection until a connection response is provided from the client terminal 2, determine that the condition of communication with the client terminal 2 is worse and set a longer buffering time as the number of connection requests is larger, and determine that the condition of communication with the client terminal 2 is better and set a shorter buffering time as the number of connection requests is smaller.

In the video display system according to the present embodiment, the projector 1 configured as described above is capable of preventing degradation in the quality of video reproduction and reducing delays in video reproduction timing.

In the present embodiment, the projector 1 configured to determine the buffering time depending on the number of connection requests has been described. Alternatively, the projector 1 according to the present embodiment may be configured to determine the buffering tie depending on an elapsed time from a connection request to the client terminal 2 until a connection response from the client terminal 2, or may be configured to determine the buffering time depending on an elapsed time from start of a process for connection with the client terminal 2 until the connection is established.

Second Embodiment

In the first embodiment, the projector 1 configured to repeat requesting connection until a connection response is provided from the client terminal 2 and determine the buffering time depending on the number of connection requests has been described.

In contrast, in the present embodiment, a projector 1 configured to determine the buffering time depending on a bit rate of a communication path between the projector 1 and a client terminal 2 will be described.

Specifically, in a video display system according to the present embodiment, the projector 1 is configured to determine that the condition of communication with the client terminal 2 is worse and set a long buffering time as the bit rate of the communication path between the projector 1 and the client terminal 2 is lower, and determine that the condition of communication with the client terminal 2 is better and set a short buffering time as the bit rate is higher.

In the video display system according to the present embodiment, the projector 1 configured as described above is capable of preventing degradation in the quality of video reproduction and reducing delays in video reproduction timing.

An embodiment of the present invention will be described in detail below with reference to the drawings. Note that components designated by the same reference numerals as those in the first embodiment are the same or corresponding components, and detailed description thereof will not be repeated.

Figure 8:
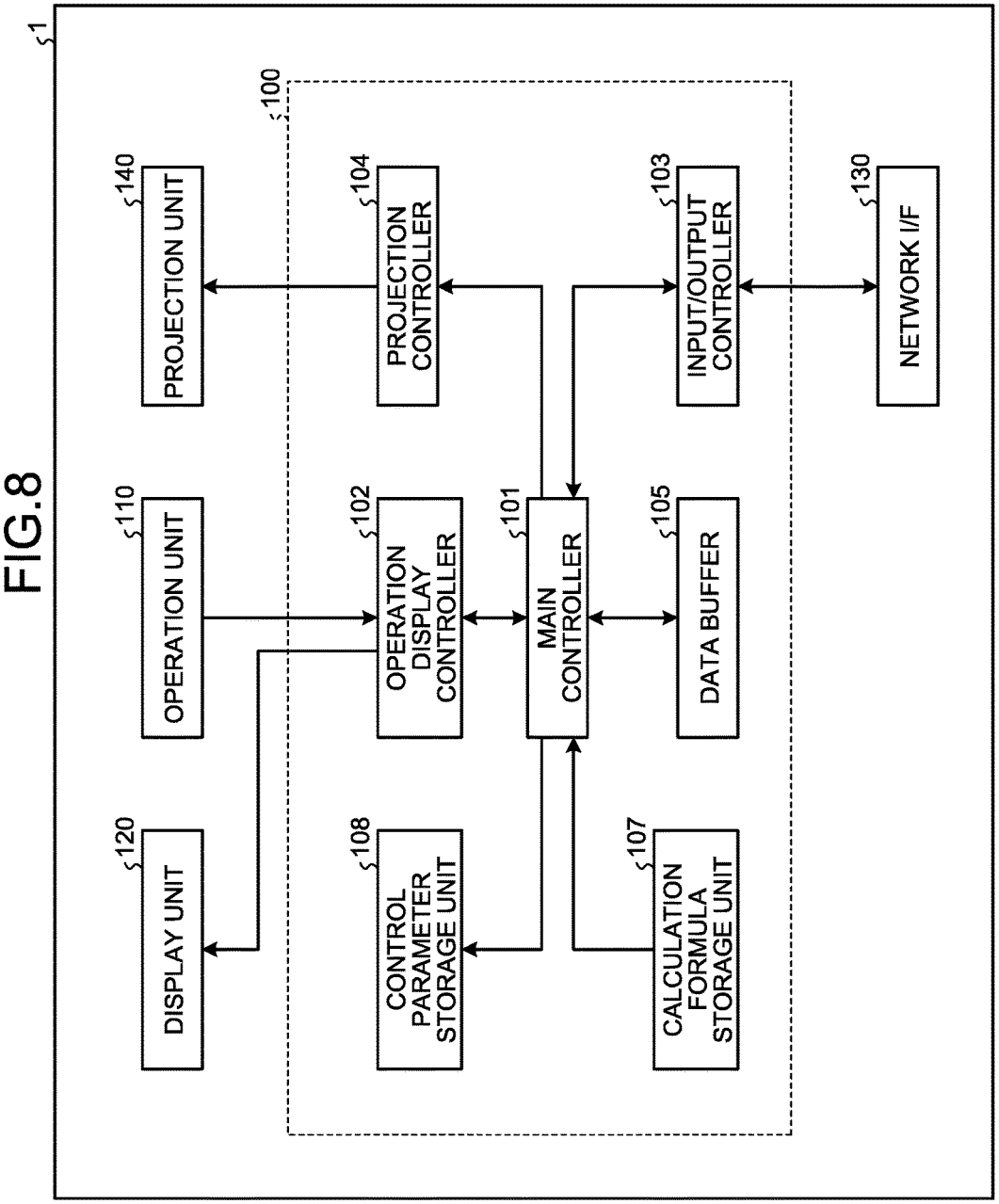
FIG. 8 is a block diagram illustrating a functional configuration of a projector according to an embodiment of the present invention.

First, a functional configuration of the projector 1 according to the present embodiment will be described with reference to FIG. 8. FIG. 8 is a block diagram schematically illustrating the functional configuration of the projector 1 according to the present embodiment.

As illustrated in FIG. 8, the projector 1 according to the present embodiment includes a control parameter storage unit 108. The control parameter storage unit 108 stores the bit rate of the communication path between the projector 1 and the client terminal 2.

Figure 9:
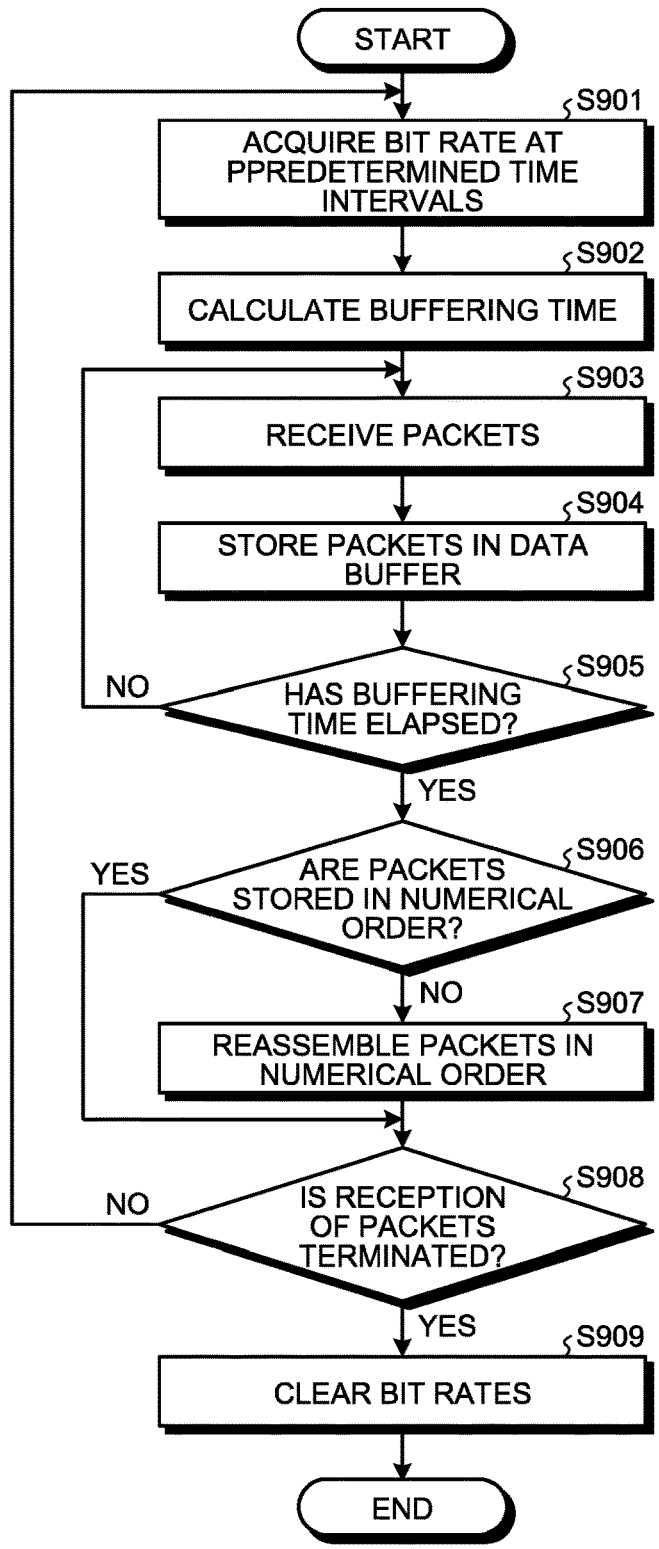
FIG. 9 is a flowchart for explaining processing for reassembling RTP packets received by a projector in an order of sequence numbers in a video display system according to an embodiment of the present invention.

Next, specific processing for reassembling RTP packets received by the projector 1 in the order of sequence numbers in the video display system according to the present embodiment will be described with reference to FIG. 9. FIG. 9 is a flowchart for explaining the processing for reassembling RTP packets received by the projector 1 in the order of sequence numbers in the video display system according to the present embodiment.

As illustrated in FIG. 9, for reassembling RTP packets received by the projector 1 in the order of sequence numbers in the video display system according to the present embodiment, the main controller 101 first acquires the bit rate of the communication path between the projector 1 and the client terminal 2 at predetermined time intervals, and stores the bit rates in the control parameter storage unit 108 (S901).

In this process, the main controller 101 changes the predetermined time depending on a change in the bit rate in such a manner as to shorten the predetermined time when the bit rate of the communication path between the projector 1 and the client terminal 2 is determined to have changed greatly or to lengthen the predetermined time when the bit rate is determined to have changed gradually.

The main controller 101 then calculates the buffering time on the basis of the bit rates stored in the control parameter storage unit 108 and the calculation formula stored in the calculation formula storage unit 107 (S902).

In this process, the main controller 101 calculates the buffering time by a calculation formula "buffering time=$T_1$+($T_3$−bit rate)×$T_4$" or "buffering time=$T_1$+{($T_3$/bit rate)−1}×$T_5$" stored in the calculation formula storage unit 107. In the formulae, $T_3$, $T_4$, and $T_5$ are given positive integers. Note that $T_3$, $T_4$, and $T_5$ may be fixed values or may be values set by the user in the projector 1 according to the present embodiment.

Furthermore, $T_3$ may be set to a maximum value of the bit rate of the communication path between the projector 1 and the client terminal 2 so that the buffering time is shortest when the actual bit rate is the maximum value.

Upon receiving RTP packets from the client terminal 2 (S903), the main controller 101 then temporarily stores the RTP packets in the data buffer 105 (S904).

The main controller 101 then determines whether or not the time elapsed from reception of the first RTP packet has reached the buffering time calculated in S902 (S905).

The main controller 101 then repeats reception of RTP packets and storage of the received RTP packets into the data buffer 105 (S903, S904) until the elapsed time reaches the buffering time calculated in S902 (S905/NO).

When the elapsed time has reached the buffering time calculated in S902 (S905/YES), the main controller 101 then reassembles the RTP packets stored in the data buffer 105 in the order of sequence numbers (S907) if the RTP packets are not in the order of sequence numbers (S906/NO) or does not reassemble the RTP packets if the RTP packets are in the order of sequence numbers (S906/YES).

The main controller 101 then reconstructs image data from the RTP packets in the order of sequence numbers, and controls the projection controller 104 to project and display video from the projection unit 140 on the basis of the reconstructed image data.

The main controller 101 then repeats the processing from S901 (S901 to S907) until reception of RTP packets is terminated (S908/NO), and clears the bit rates stored in the control parameter storage unit 108 (S909) when reception of RTP packets is terminated (S908/YES).

As described above, in the video display system according to the present embodiment, the projector 1 is configured to determine the buffering time depending on the bit rate of the communication path between the projector 1 and the client terminal 2.

Specifically, in a video display system according to the present embodiment, the projector 1 is configured to determine that the condition of communication with the client terminal 2 is worse and set a long buffering time as the bit rate of the communication path between the projector 1 and the client terminal 2 is lower, and determine that the condition of communication with the client terminal 2 is better and set a short buffering time as the bit rate is higher.

In the video display system according to the present embodiment, the projector 1 configured as described above is capable of preventing degradation in the quality of video reproduction and reducing delays in video reproduction timing.

Third Embodiment

In the first embodiment, the projector 1 configured to repeat requesting connection until a connection response is provided from the client terminal 2 and determine the buffering time depending on the number of connection requests has been described. In the second embodiment, the projector 1 configured to determine the buffering time depending on the bit rate of the communication path between the projector 1 and the client terminal 2 has been described.

In contrast, in the present embodiment, a projector 1 configured to determine the buffering time depending on the type of data (hereinafter referred to as a "data type") transmitted from a client terminal 2 will be described.

Specifically, in a video display system according to the present embodiment, the projector 1 is configured to determine that the order of RTP packets is more likely to be different between the receiving end and the transmitting end and set a longer buffering time as the data amount of data of a data type transmitted from the client terminal 2 is larger, and determine that the order of RTP packets is less likely to be different between the receiving end and the transmitting end and set a shorter buffering time as the amount of data of a data type is smaller.

In the video display system according to the present embodiment, the projector 1 configured as described above is capable of preventing degradation in the quality of video reproduction and reducing delays in video reproduction timing.

An embodiment of the present invention is described in detail below with reference to the drawings. Note that components designated by the same reference numerals as those in the first and second embodiments are the same or corresponding components, and detailed description thereof will not be repeated.

Figure 10:
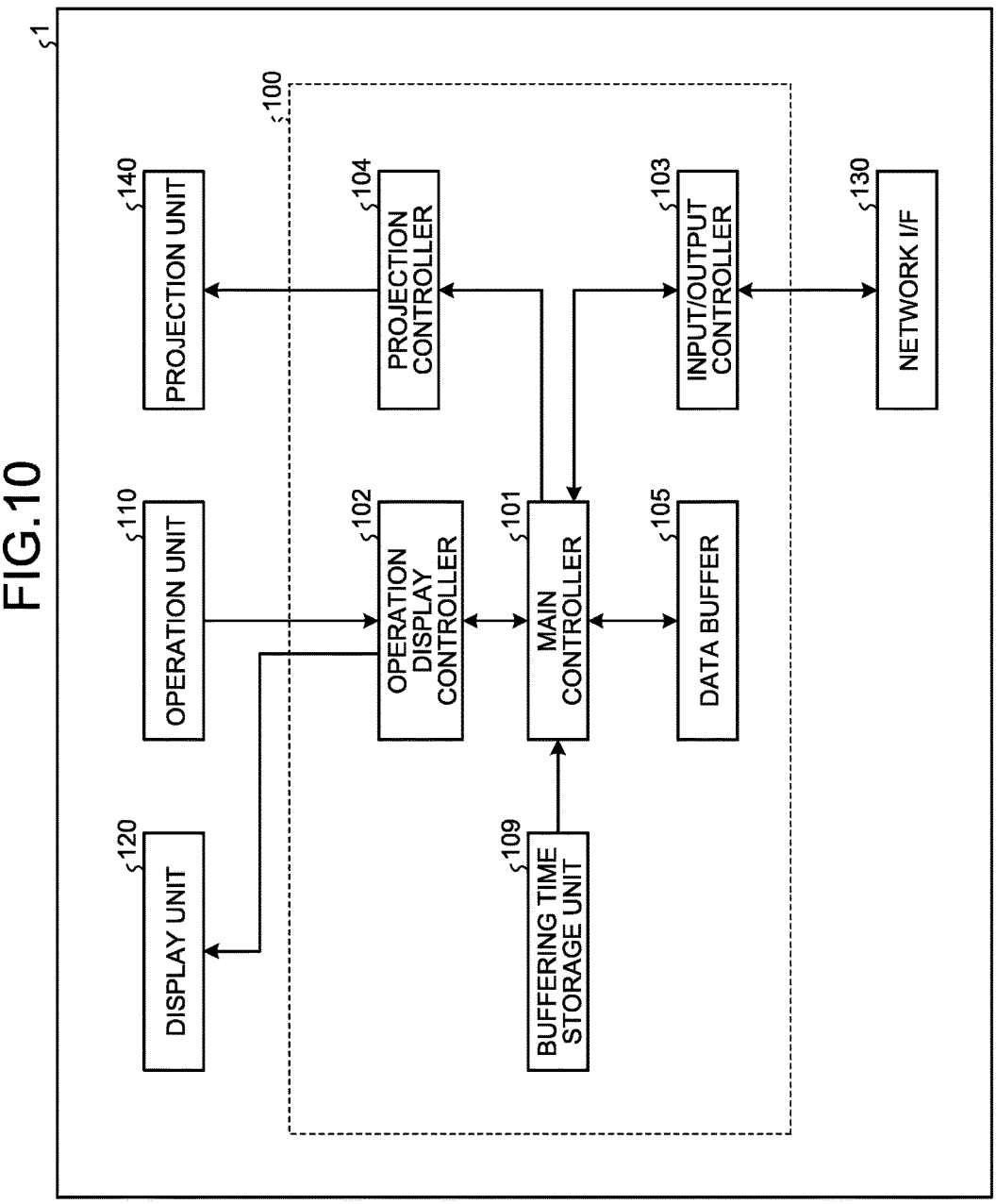
FIG. 10 is a block diagram schematically illustrating a functional configuration of a projector according to an embodiment of the present invention.

First, a functional configuration of the projector 1 according to the present embodiment will be described with reference to FIG. 10. FIG. 10 is a block diagram schematically illustrating the functional configuration of the projector 1 according to the present embodiment. As illustrated in FIG. 10, the projector 1 according to the present embodiment includes a buffering time storage unit 109. The buffering time storage unit 109 stores a buffering time determination table.

Here, the buffering time determination table stored in the buffering time storage unit 109 according to the present embodiment will be described with reference to FIG. 11. FIG. 11 is a table illustrating an example of the buffering time determination table stored by the buffering time storage unit 109 according to the present embodiment. In the description below, assume that the data amounts of data compared using the same reproduction time satisfy the relation of audio<video<best effort<background.

As illustrated in FIG. 11, in the buffering time determination table stored by the buffering time storage unit 109 according to the present embodiment, the buffering time is associated with each data type. In FIG. 11, $T_6$, $T_7$, $T_8$, and $T_9$ are given positive integers satisfying the relation of $T_6<T_7<T_8<T_9$. Note that $T_6$, $T_7$, $T_8$, and $T_9$ may be fixed values or may be values set by the user in the projector 1 according to the present embodiment.

As described above, in the buffering time determination table in the present embodiment, a data type whose data amount is smaller is associated with a shorter buffering time while a data type whose data amount is larger is associated with a longer buffering time.

In addition, in the video display system according to the present embodiment, the projector 1 is configured to determine a buffering time associated with the same data type as the data type of data transmitted from the client terminal 2 to be a latest buffering time among the buffering times in the buffering time determination table.

This is because the order of RTP packets is more likely to be different between the receiving end and the transmitting end and the buffering time thus needs to be longer as the data amount of data of a data type transmitted from the client terminal 2 is larger, while the order of RTP packets is less likely to be different between the receiving end and the transmitting end and the buffering time may be shorter as the data amount of data of a data type is smaller.

Figure 12:
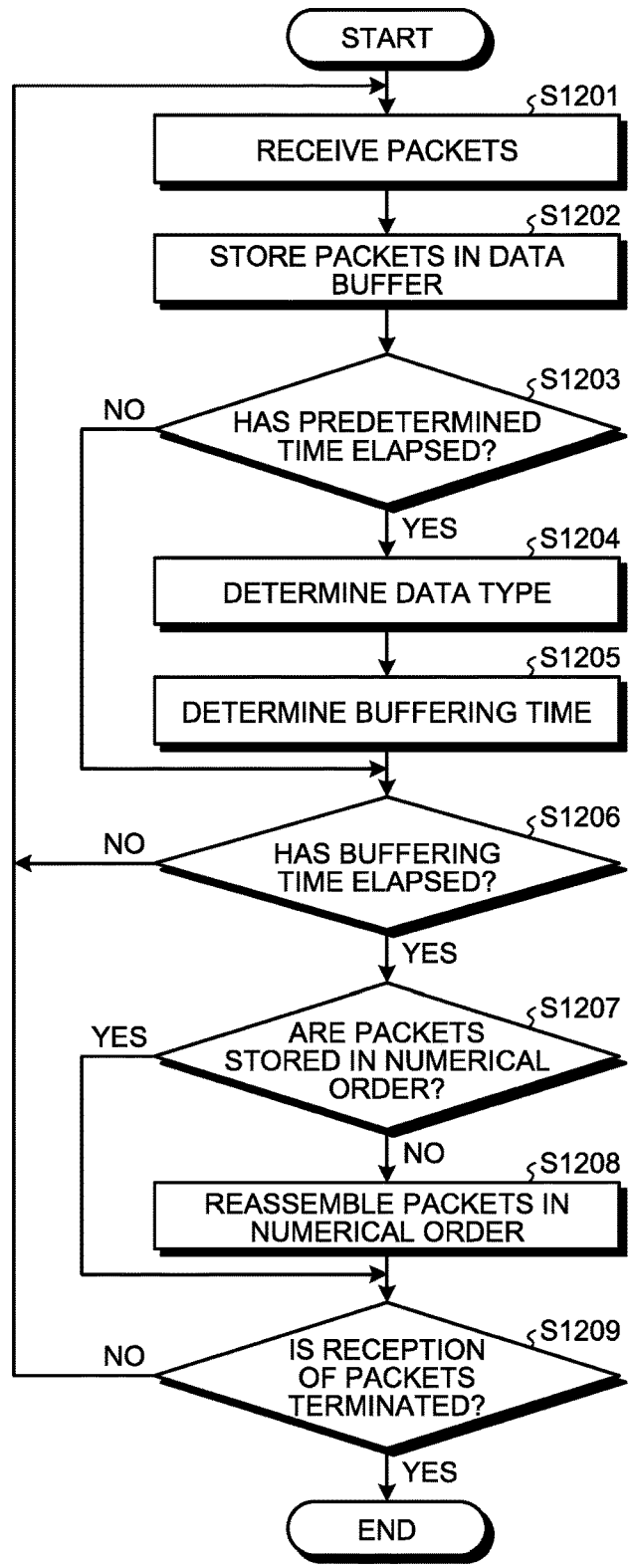
FIG. 12 is a flowchart for explaining processing for reassembling RTP packets received by a projector in an order of sequence numbers in a video display system according to an embodiment of the present invention.

Next, specific processing for reassembling RTP packets received by the projector 1 in the order of sequence numbers in the video display system according to the present embodiment will be described with reference to FIG. 12. FIG. 12 is a flowchart for explaining the processing for reassembling RTP packets received by the projector 1 in the order of sequence numbers in the video display system according to the present embodiment.

As illustrated in FIG. 12, for reassembling RTP packets received by the projector 1 in the order of sequence numbers in the video display system according to the present embodiment, upon receiving RTP packets (S1201) the main controller 101 first temporarily stores the RTP packets into data buffer 105 (S1202).

The main controller 101 then determines whether or not a predetermined time has elapsed from previous determination of the buffering time (S1203).

In this process, the main controller 101 changes the predetermined time depending on a change in the data type in such a manner as to shorten the predetermined time when the data type is determined to have changed greatly or to lengthen the predetermined time when the data type is determined to have changed gradually.

If the predetermined time is determined to have elapsed In the determination process in S1203 (S1203/YES), the main controller 101 then determines the data type of the RIP packets received in S1201 (S1204).

The main controller 101 then determines a buffering time associated with the same data type as the data type determined in S1203 to be the latest buffering time among the buffering times in the buffering time determination table (S1205).

If the predetermined time is determined not to have elapsed in the determination process in S1203 (S1203/NO) or after the buffering time is determined in S1205, the main controller 101 then determines whether or not the time elapsed from reception of the first RIP packet has reached the buffering time determined in S1205 (S1206).

The main controller 101 then repeats the processing of S1201 to S1205 until the elapsed time reaches the buffering time determined in S1205 (S1206/NO).

When the elapsed time has reached the buffering time determined in S1205 (S1206/YES), the main controller 101 then reassembles the RTP packets stored in the data buffer 105 in the order of sequence numbers (S1208) if the RTP packets are not in the order of sequence numbers (S1207/NO) or does not reassemble the RTP packets if the RTP packets are in the order of sequence numbers (S1207/YES).

The main controller 101 then reconstructs image data from the RTP packets in the order of sequence numbers, and controls the projection controller 104 to project and display video from the projection unit 140 on the basis of the reconstructed image data.

The main controller 101 then repeats the processing from S1201 (S1201 to S1208) until reception of RTP packets is terminated (S1209/NO), and terminates the processing for reassembling RTP packets in the order of sequence numbers when reception of RTP packets is terminated (S1209/YES).

As described above, in the video display system according to the present embodiment, the projector 1 is configured to determine the buffering time depending on the data type of data transmitted from the client terminal 2.

Specifically, in a video display system according to the present embodiment, the projector 1 is configured to determine that the order of RTP packets is more likely to be different between the receiving end and the transmitting end and set a longer buffering time as the data amount of data of a data type transmitted from the client terminal 2 is larger, and determine that the order of RTP packets is less likely to be different between the receiving end and the transmitting end and set a shorter buffering time as the amount of data of a data type is smaller.

In the video display system according to the present embodiment, the projector 1 configured as described above is capable of preventing degradation in the quality of video reproduction and reducing delays in video reproduction timing.

Fourth Embodiment

In the first embodiment, the projector 1 configured to repeat requesting connection until a connection response is provided from the client terminal 2 and determine the buffering time depending on the number of connection requests has been described. In the second embodiment, the projector 1 configured to determine the buffering time depending on the bit rate of the communication path between the projector 1 and the client terminal 2 has been described. In the third embodiment, the projector 1 configured to determine the buffering time depending on the data type of data transmitted from the client terminal 2 has been described.

In contrast, in the present embodiment, a projector 1 configured to determine the buffering time depending on the amount of data transmitted from a client terminal 2 will be described.

Specifically, in a video display system according to the present embodiment, the projector 1 is configured to determine that the order of RTP packets is more likely to be different between the receiving end and the transmitting end and set a longer buffering time as the amount of data transmitted from the client terminal 2 is larger, and determine that the order of RTP packets is less likely to be different between the receiving end and the transmitting end and set a shorter buffering time as the amount of data is smaller.

In the video display system according to the present embodiment, the projector 1 configured as described above is capable of preventing degradation in the quality of video reproduction and reducing delays in video reproduction timing.

An embodiment of the present invention is described in detail below with reference to the drawings. Note that components designated by the same reference numerals as those in the first to third embodiments are the same or corresponding components, and detailed description thereof will not be repeated.

First, a functional configuration of the projector 1 according to the present embodiment will be described with reference to FIG. 8 again. As illustrated in FIG. 8, the projector 1 according to the present embodiment includes a control parameter storage unit 108. The control parameter storage unit 108 stores the amount of data the projector 1 receives from the client terminal 2.

Figure 13:
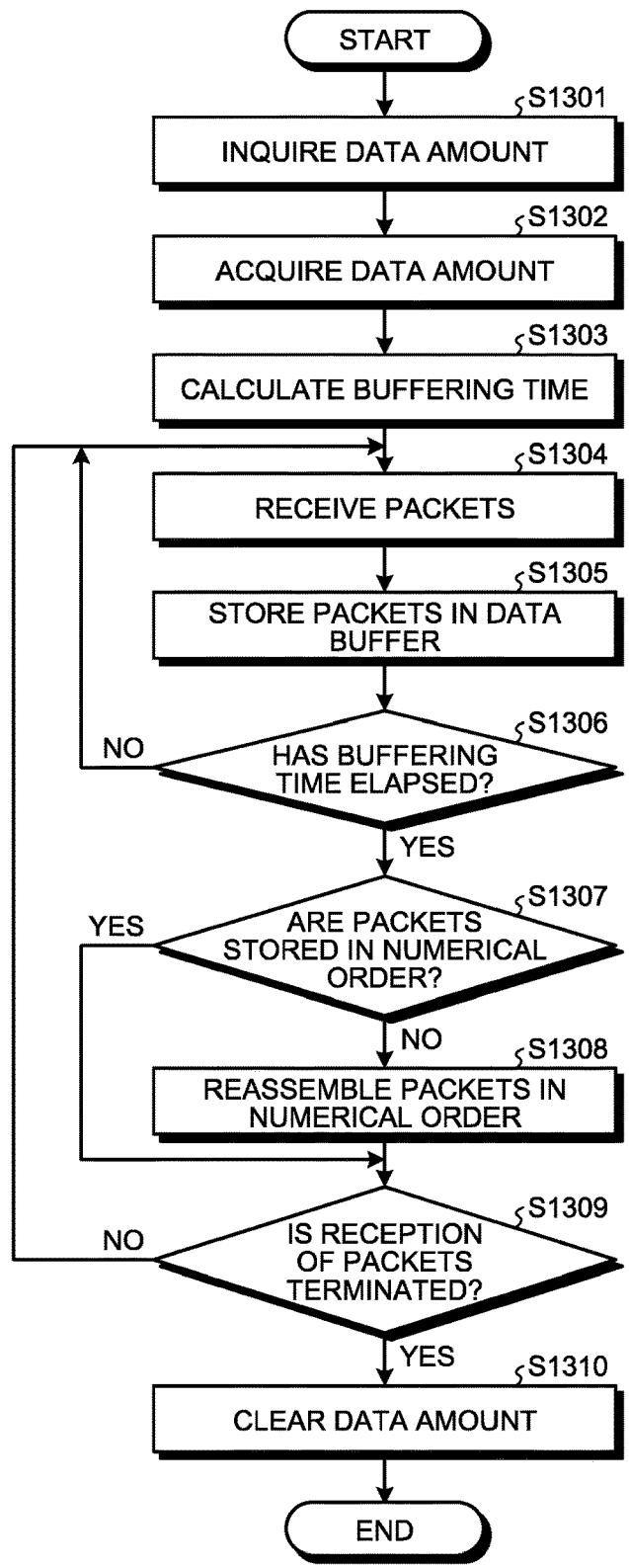
FIG. 13 is a flowchart for explaining processing for reassembling RTP packets received by a projector in an order of sequence numbers in a video display system according to an embodiment of the present invention.

Next, specific processing for reassembling RTP packets received by the projector 1 in the order of sequence numbers in the video display system according to the present embodiment will be described with reference to FIG. 13. FIG. 13 is a flowchart for explaining the processing for reassembling RTP packets received by the projector 1 in the order of sequence numbers in the video display system according to the present embodiment.

As illustrated in FIG. 13, for reassembling RTP packets received by the projector 1 in the order of sequence numbers in the video display system according to the present embodiment, the main controller 101 first inquires of the client terminal 2 the amount of image data to be transmitted (S1301).

Upon acquiring the data amount from the client terminal 2 in response to the inquiry in S1301, the main controller 101 then stores the data amount in the control parameter storage unit 108 (S1302).

The main controller 101 then calculates the buffering time on the basis of the data amount stored in the control parameter storage unit 108 and the calculation formula stored in the calculation formula storage unit 107 (S1303).

In this process, the main controller 101 calculates the buffering time by a calculation formula "buffering time=$T_1$+(data amount−$T_{11}$)×$T_{12}$" or "buffering time=$T_1$+{1−($T_{11}$/data amount)}×$T_{11}$" stored in the calculation formula storage unit 107. In the formulae, $T_{11}$, $T_{12}$, and $T_{13}$ are given positive integers. Note that $T_n$, $T_{12}$, and $T_{13}$ may be fixed values or may be values set by the user in the projector 1 according to the present embodiment.

Upon receiving RTP packets from the client terminal 2 (S1304), the main controller 101 then temporarily stores the RTP packets in the data buffer 105 (S1305).

The main controller 101 then determines whether or not the time elapsed from reception of the first RTP packet has reached the buffering time calculated in S1303 (S1306).

The main controller 101 then repeats reception of RTP packets and storage of the received RTP packets into the data buffer 105 (S1304, S1305) until the elapsed time reaches the buffering time calculated in S1303 (S1306/NO).

When the elapsed time has reached the buffering time calculated in S1303 (S1306/YES), the main controller 101 then reassembles the RTP packets stored in the data buffer 105 in the order of sequence numbers (S1308) if the RTP packets are not in the order of sequence numbers (S1307/NO) or does not reassemble the RTP packets if the RTP packets are in the order of sequence numbers (S1307/YES).

The main controller 101 then reconstructs image data from the RTP packets in the order of sequence numbers, and controls the projection controller 104 to project and display video from the projection unit 140 on the basis of the reconstructed image data.

The main controller 101 then repeats the processing from S1304 (S1304 to S1308) until reception of RTP packets is terminated (S1309/NO), and clears the data amount stored in the control parameter storage unit 108 (S1310) when reception of RTP packets is terminated (S1309/YES).

As described above, in the video display system according to the present embodiment, the projector 1 is configured to determine the buffering time depending on the amount of data transmitted from the client terminal 2.

Specifically, in a video display system according to the present embodiment, the projector 1 is configured to determine that the order of RTP packets is more likely to be different between the receiving end and the transmitting end and set a longer buffering time as the amount of data transmitted from the client terminal 2 is larger, and determine that the order of RTP packets is less likely to be different between the receiving end and the transmitting end and set a shorter buffering time as the amount of data is smaller.

In the video display system according to the present embodiment, the projector 1 configured as described above is capable of preventing degradation in the quality of video reproduction and reducing delays in video reproduction timing.

In the first to fourth embodiments, the projectors 1 configured to calculate or determine the buffering time depending on the number of connection requests, the bit rate, the data type, and the data amount, respectively, have been described. Alternatively, the projectors 1 according to the first to fourth embodiments may be configured to calculate or determine the buffering size depending on the number of connection requests, the bit rate, the data type, and the data mount, respectively.

When the projectors 1 according to the first to fourth embodiments are thus configured, RTP packets corresponding to the calculated or determined buffering size are stored in the data buffer 105. When the data size of the RTP packets stored in the data buffer 105 reaches the buffering size, the projectors 1 then reassemble the RTP packets stored in the data buffer 105 in the order of sequence numbers.

According to an embodiment of the present invention, degradation in the quality of content reproduction is prevented and delays in content reproduction timing are reduced.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. A content reproduction device, comprising:
a communication interface configured to communicate with an information processing device; and
processing circuitry configured to
sequentially acquire pieces of data from the information processing device via the communication interface;
buffer the acquired pieces of data in a first memory;
determine a buffering condition for buffering the acquired pieces of data in the first memory, depending on a condition of communication with the information processing device;
reassemble the pieces of data buffered in the first memory in a predetermined order when the determined buffering condition is satisfied; and
reproduce a content based on the reassembled pieces of data, wherein
the processing circuitry is further configured to, when communication is established between the information processing device and the content reproduction device, calculate a buffering time for buffering the pieces of data in the first memory based on a count of a counter and a calculation formula stored in a second memory, wherein the count is incremented after a certain time elapses from when the processing circuitry requests connection to the information processing device while a response from the information processing device is not received, and
when a time elapsed from start of the buffering of the acquired pieces of data in the first memory has reached the calculated buffering time, the processing circuitry is further configured to reassemble the pieces of data buffered in the first memory in a predetermined order.

2. The content reproduction device according to claim 1, wherein the processing circuitry is further configured to determine the buffering condition depending on a number of retransmission requests or connection requests made to the information processing device.

3. The content reproduction device according to claim 1, wherein the processing circuitry is further configured to determine the buffering condition depending on an elapsed time from start of a process for connection with the information processing device until the connection is established.

4. The content reproduction device according to claim 1, wherein the processing circuitry is further configured to determine the buffering condition depending on a bit rate of a communication path to/from the information processing device.

5. The content reproduction device according to claim 1, wherein the processing circuitry is further configured to determine the buffering condition depending on a data type of the acquired pieces of data.

6. The content reproduction device according to claim 1, wherein the processing circuitry is further configured to determine the buffering condition depending on an amount of the acquired pieces of data.

7. The content reproduction device according to claim 1, wherein the processing circuitry is further configured to
determine a buffering size for buffering the acquired pieces of data in the first memory depending on a condition of communication with the information processing device, and
when a data size of the pieces of data buffered in the first memory has reached the determined buffering size, reassemble the pieces of data buffered in the first memory in a predetermined order.

8. A content reproduction method, comprising:
communicating with an information processing device via a communication interface;
determining a buffering condition for buffering pieces of data acquired from the information processing device in a first memory, depending on a condition of communication with the information processing device;
sequentially acquiring pieces of data from the information processing device via the communication interface;
buffering the acquired pieces of data in the first memory;
reassembling the pieces of data buffered in the first memory in a predetermined order when the determined buffering condition is satisfied; and
reproducing a content based on the reassembled pieces of data, wherein
the determining step further comprises, when communication is established between the information processing device and the content reproduction device, calculating a buffering time for buffering the pieces of data in the first memory based on a count of a counter and a calculation formula stored in a second memory, wherein the count is incremented after a certain time elapses from when a connection to the information processing device is requested while a response from the information processing device is not received, and the reassembling step includes reassembling, when a time elapsed from start of the buffering of the acquired pieces of data in the first memory has reached the determined buffering time, the pieces of data buffered in the first memory in a predetermined order.

9. The content reproduction device of claim 1, wherein the processing circuitry is further configured to request the connection to the information processing device, and when the response to the request is not received, increment the count, and repeat the request.

10. The content reproduction device of claim 1, wherein when the response is received before the certain time elapses after the request, the processing circuitry is configured to calculate the buffering time.

11. The content reproduction device of claim 1, wherein the processing circuitry is further configured to calculate the buffering time using the calculation formula, which is a linear function of the count.

* * * * *